March 12, 1968     W. GILLESPIE, JR     3,373,069

METHOD OF MAKING AN INFLATABLE PANEL

Original Filed Jan. 13, 1961     7 Sheets-Sheet 1

INVENTOR.
WARREN GILLESPIE, JR.
BY

*Wallace Nelson*
ATTORNEYS

March 12, 1968  W. GILLESPIE, JR  3,373,069
METHOD OF MAKING AN INFLATABLE PANEL
Original Filed Jan. 13, 1961  7 Sheets-Sheet 3

INVENTOR.
WARREN GILLESPIE, JR.
BY
ATTORNEYS

INVENTOR.
WARREN GILLESPIE, JR.

March 12, 1968    W. GILLESPIE, JR    3,373,069
METHOD OF MAKING AN INFLATABLE PANEL
Original Filed Jan. 13, 1961    7 Sheets-Sheet 6

INVENTOR.
WARREN GILLESPIE, JR.
BY
*Wallace J Nelson*
ATTORNEYS

March 12, 1968  W. GILLESPIE, JR  3,373,069
METHOD OF MAKING AN INFLATABLE PANEL
Original Filed Jan. 13, 1961  7 Sheets-Sheet 7

INVENTOR.
WARREN GILLESPIE, JR.
BY
Wallace Judson
ATTORNEYS

# United States Patent Office 3,373,069
Patented Mar. 12, 1968

3,373,069
METHOD OF MAKING AN INFLATABLE PANEL
Warren Gillespie, Jr., Newport News, Va., assignor to the United States of America as represented by the Administrator of the National Aeronautics and Space Administration
Original application Jan. 13, 1961, Ser. No. 82,658, now Patent No. 3,220,004, dated Nov. 23, 1965. Divided and this application Aug. 10, 1964, Ser. No. 392,992
2 Claims. (Cl. 156—285)

ABSTRACT OF THE DISCLOSURE

This invention relates to a method of forming inflatable panels for use as erectable radio signal reflecting space vehicles wherein two sheets of the material making up the inflatable are placed in overlying relationship on a plate having a plurality of male protuberances thereon, a partial vacuum is created between the plate and the sheet of material adjacent thereto to draw the sheets into conformity with the male protuberances thereon, a flow of heated gas is directed against the top of said sheets to thereby further conform the sheets to the pattern on the plate through the combined effects of heat and pressure, a sublimatory inflation material is inserted between the sheets and the peripheries of the sheets are bonded to thereby form an inflatable panel.

---

The invention described herein may be manufactured and used by or for the Government of the United States of America for governmental purposes without the payment of any royalties thereon or therefor.

This application is a division of application Ser. No. 82,658 filed Jan. 13, 1961, and now U.S. Patent No. 3,220,004.

This invention relates generally to planetary orbital communication satellites and more specifically to a method of making an erectable, inflatable radio signal reflecting space vehicles.

The realization in recent years of the ability to place a space vehicle in a long term orbit about the Earth has created a great deal of interest in the potential of such vehicles as passive communication satellites. Properly constructed and placed in a reliable orbit, a passive communication satellite, or a series of such vehicles, may serve to relay radio signals from one continent to another, and over other great distances, by reflection of received signals. A communications system of this sort may serve to alleviate the already over-burdened condition of transoceanic telephone cables, or the like, and would be far more reliable than unrelayed high frequency radio circuits, which are susceptible to disruption due to varying ionospheric conditions. With these advantages in mind, research programs have been undertaken to study the feasibility of constructing and placing in orbit a passive communication relay satellite. As a result of one such research program, conducted as part of an undertaking denominated "Project Echo," a spherical space vehicle one hundred feet in diameter has been placed in Earth orbit, and radio signals have been successfully relayed by this satellite from one station to another far removed therefrom. The details of this passive communication satellite may be found by reference to an application for United States Letters Patent of William John O'Sullivan, Ser. No. 835,153, filed Aug. 20, 1959, now Patent No. 2,996,212. Although the space vehicle constructed along the lines described in the above-identified patent is considered to be highly successful and to afford the first practical embodiment of an erectable communication satellite, several advantages appear to be attainable by modifying the spherical shape thereof, and in modifying the skin structure used therefor.

One inherent limitation in the use of a spherical satellite lies in the large size and weight thereof required to provide adequate reflective surface area. For communications relay purposes only a small segment of such a spheroid is actually utilized as a reflector or reflecting surface, and the remainder of the sphere serves no function once a stable orbit has been achieved. Thus the greater portion of such a space vehicle is merely excess structure, creating booster rocket payload capability waste problems, while serving only to obviate the need for alignment or attitude control means. Further, by presenting a uniformly reflective surface in all directions, such a spheroid is subjected to the orbit modifying effects of solar pressure, caused by the energy expended upon the satellite by the impingement of light thereon, and the consequent reflection thereof. Further, since a spherical vehicle of this type possesses a relatively high volume to weight ratio, the perturbating effects of solar pressure are increased. In addition to these difficulties in maintaining a reliable orbit, the satellite shape or configuration tends to be easily changed by both solar pressure and micrometeorite collisions.

The material disclosed in the aforementioned O'Sullivan patent, while it does possess a degree of stiffness or rigidity when once erected and tensilely stressed in accordance with the teachings of such application, does not have sufficient rigidity to reliably maintain the desired configuration when exposed for lengthy periods of time to such environmental hazards as solar pressure, micrometeorite collisions, and the like.

In view of the desirability of providing passive communication satellites, and the limitations of presently known structures and materials available for constructing a reliable satellite of this type, it has become desirable to design a novel structure to serve as a communications relay vehicle of reliable, maintainable configuration and orientation. To construct such a space vehicle of improved design, the development of new materials has become a requirement, as heretofore utilized materials fail to provide sufficient rigidity, and are unduly affected by solar pressure. Finally, new processes have been required to make the novel materials desired for use in such space vehicles. The present invention is a result of considerable integrated research and development towards solving the problems encountered in providing a practical passive communication relay satellite.

Accordingly, it is an object of this invention to provide a new and improved communication satellite.

Another object of the present invention is the provision of a new and improved automatically erectable structural element.

A further object of the instant invention is to provide new and improved methods of forming inflatable structural panels.

Still another object of this invention is the provision of an actively attitude oriented passive communication satellite.

Yet another object of the present invention is to provide a passively attitude oriented communication satellite.

A still further object of the instant invention is the provision of a passive communication satellite adapted to reflect radio frequency waves.

An additional object of this invention is to provide a passive communication satellite adapted to be pervious to light frequency waves.

Another additional object of the present invention is the provision of a space vehicle which is pervious to light frequency waves and impervious to radio frequency waves.

A further additional object of the instant invention is to provide an orbital space vehicle adapted to be attitude-stabilized by the gravitational-centrifugal force gradient.

Still another additional object of the present invention is the provision of new and improved methods of forming inflatable laminated panels of waffle-like cross-section.

According to one aspect of the present invention, the fore-going and other objects are attained by providing an inflatably erectable passive communication satellite adapted to be folded into a compact package for storage in a launch vehicle nose cone or in the final stage of a multi-stage rocket, and having upon inflation erection at least one spherical section for presentation to a source of radio frequency signals transmitted from the Earth; such satellite being formed at least in part of inflatable elements constructed of material in sheet form adapted to reflect radio frequency waves and so constructed as to possess structural rigidity upon erection sufficient to retain an erected configuration in a interplanetary spatial vacuum without the presence of internal pressure.

In accordance with another aspect of this invention, the aforesaid and other objects are attained by providing a method of manufacturing inflatable laminated structural panels, comprising the steps of forming a waffle-like cross-sectional shape in a plurality of sheets of material, juxta-positioning at least two of such sheets, bonding such sheets together to form an envelope, and providing communication with the interior of such envelope for a pressure producing means.

The foregoing and other objects and many of the attendant advantages of this invention will be readily apparent as the same become better understood by reference to the following detailed description when considered in connection with the accompanying drawings wherein:

Figure 1:
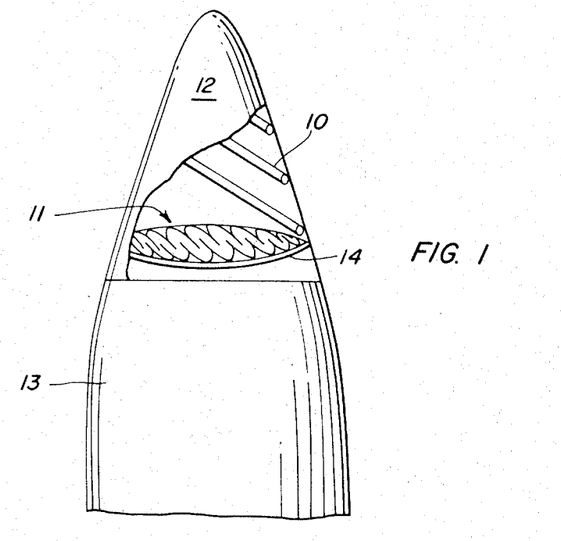
FIG. 1 is a partial elevational view, partly broken away, of a typical launch vehicle for a satellite.

Referring now more particularly to the drawings, wherein like reference numerals designate identical parts throughout the several views, and more particularly to FIG. 1, there is shown by way of illustration a passive communication satellite, generally designated by the reference numeral 11, folded for storage within nose portion 12 of the final stage or payload container 13 of a launch vehicle, not shown. The exact positioning and mounting of satellite 11 within nose portion 12 forms no part of the present invention, and may be such as to permit ejection of the erectable satellite 11 either forwardly or rearwardly along the longitudinal vehicle axis, or radially therefrom, upon reaching orbital velocity and altitude. As shown in FIG. 1, by way of example, satellite 11 may rest on a displaceable tray 14 which is temporarily restrained in the position shown but is adapted to be released upon separation of nose portion 12 from final stage 13 through the operation of conventional mechanisms, not shown. A spring 10 may be provided in a normally compressed position so as to forcibly eject satellite 11 and tray 14 from nose portion 12 when tray 14 is released. Any conventional devices may be provided to carry out the aforementioned operation within the scope of this invention. It is further contemplated that a plurality of satellites 11 may be positioned within a launch vehicle nose cone and ejected therefrom sequentially, as, for example, at each nose cone pass through the apogee of an elliptical orbit thereof, so as to provide a spaced series of communications satellites.

Passive communication satellite 11 may have any one of several configurations when erected, and the selection of one of such configurations will be determined in practice by consideration of various factors, such as the anticipated orbital altitude, the term of the desired orbit, the percentage of time of exposure to solar pressure, the anticipated rate of micrometeorite activity in the orbital area, the degree of accuracy of attitude desired, the orbital weight capabilities of the launch vehicle to be used, and the like. Further, various materials may be used to form the several component parts of such a satellite, and the selection of these materials will be governed, in part, by the aforementioned considerations as well as the configuration to be used.

Basically, each of the configurations hereinafter to be described includes a primary structure including a mast, an annular support means, and a plurality of lightly tensioned spokes interconnecting the mast and the support means. This primary structure serves as a framework for a secondary structure which includes a reflecting surface formed in the shape of a portion of a sphere, and which may be termed a spherical section. The dimensions required for such a spherical section, and, accordingly, the attendant primary structure, may, in practice, be determined by normal engineering calculations; these calculations taking into account such variable factors as altitude, anticipated margin of error in satellite orientation or attitude, and the distances between the several radio transmitting and receiving stations involved.

Figure 2:
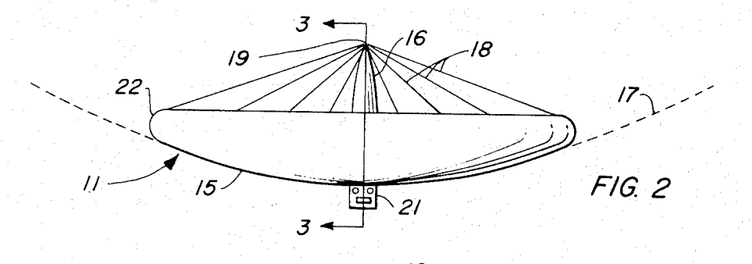
FIG. 2 is a side view of one embodiment of a communication satellite according to the present invention.
Figure 3:
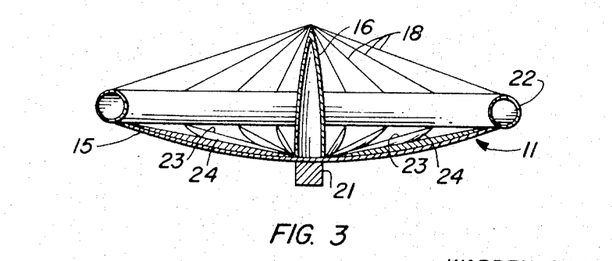
FIG. 3 is a sectional view taken along line 3—3 of FIG. 2.

Referring now to FIGS. 2 and 3, there is shown one embodiment of passive communication satellite 11 in erected condition, which may be accomplished by means hereinafter described upon attainment of orbital velocity and altitude. Satellite 11, as shown in FIG. 2, is provided with a reflecting surface which comprises a generally spherical or spheroidal section 15, a mast 16 mounted on and carried by spherical section 15 and extending along a radial line of the imaginary sphere 17 of which spherical section 15 is a segment, and strengthening elements such as lightly tensioned spokes 18 connected at one end thereof to end 19 of mast 16 by spoke connecting means, not shown. Satellite 11 is preferably further provided with active attitude control means 21, set forth more fully hereinafter. Spherical section 15 is supported at the outer, circular, periphery thereof by inflatable annular tube 22, best seen in FIG. 3, constituting a peripheral support means, which in turn may be connected to the other end of the spokes 18 and thereby interconnected with mast 16. For increased structural rigidity, there may be included as an integral part of satellite 11 a plurality of wire spokes 23, lightly tensioned, connected at one end thereof to spoke connecting means, not shown, mounted on mast 16 near the intersection thereof with spherical section 15, and at the other end thereof to inflatable annular tube 22. The ends of spokes 18 and 23 adjacent and connected to mast 16 should be substantially equidistant from the plane of tube 22. Further, rib panels 24 may be mounted between spokes 23 and spherical section 15, and connected to both, thus affording greater structural rigidity and aiding in forming the shape of spherical section 15 during erection.

Since satellite 11 is not a complete sphere, but defines only a section of a sphere, it is desirable to provide some means for insuring that spherical section 15 is oriented and maintained in a preselected position relative to the surface of the Earth in order to properly reflect radio frequency signals directed toward the passive communication satellite for relay to an Earth receiving station. Means of this type may be provided for both satellite 11 and each of the other satellite configurations hereinafter disclosed. As shown in FIG. 2, active attitude control means 21 is provided to perform this Earth-orienting function in satellite 11.

Active attitude control means 21, which may be mounted on satellite 11 as hereinbefore mentioned and which also may be utilized with any of the orbital satellite configurations hereinafter disclosed, may in practice be any conventional active attitude control means; for example, that disclosed in the application for Letters Patent of the United States by Warren Gillespie, Jr. et al., Ser. No. 853,984, filed Nov. 18, 1959, now Patent No. 3,038,077 or in United States Letters Patent 2,740,961, issued Apr. 3, 1956. Such active attitude control means may operate in various ways, such as, for example, by rotatively scanning the horizon of the Earth in order to detect any deviation from a generally horizontal reference plane. Regardless of the specific operation of such a device in detecting deviations from an Earth oriented attitude, correction may be afforded by, for example, the automatic actuation of jet exhaust nozzles in proper directions to correct satellite attitude in accordance with well recognized physical principles. Since the details of such an active attitude control means form no part of the present invention, they are not herein disclosed. Any of the analogous prior art systems will suffice so long as they are capable of sensing and actively correcting attitude errors.

The various structural elements of satellite 11, aside from spokes 18 and 23, may be formed of a thin flexible material which is adapted to be compactly folded, as for example, shown in FIG. 1, but which upon erection is adapted to reflect radio frequency signals and possesses a sufficient rigidity or stiffness for reliable configuration retention when exposed in an interplanetary spatial vacuum to the various perturbations therein encountered. Such materials, which form an integral part of the present invention, are applicable to several configurations herein disclosed, as well as other structural shapes, and are therefore discussed more fully hereinafter, following the description of other satellite configurations. Similarly, a description of the various structural connections herein contemplated, such as the interconnection of spokes 18 to mast 16 and tube 22, and of wire spokes 23 to rib panels 24, tube 22, and similar jointure details, since they may be common to the several configurations herein disclosed, are discussed following a consideration of the several configurations.

Figure 4:
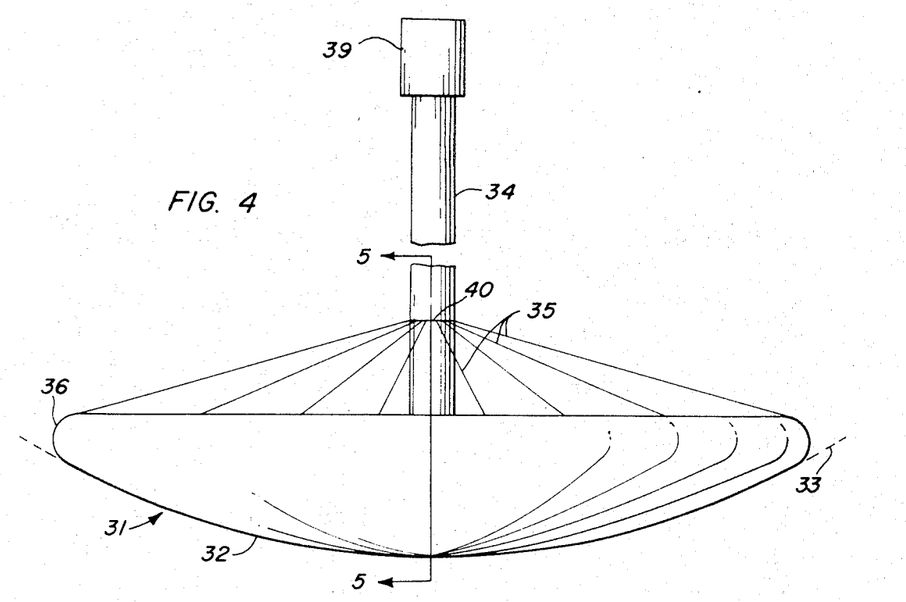
FIG. 4 is a side view of another embodiment of a communication satellite according to this invention.
Figure 5:
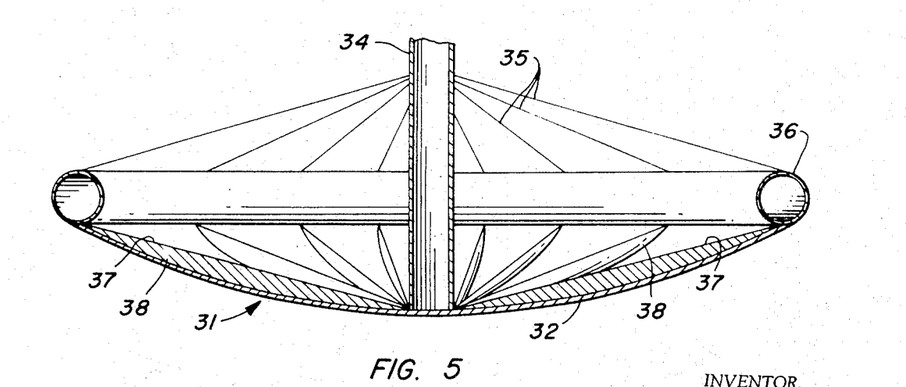
FIG. 5 is a partial sectional view taken along line 5—5 of FIG. 4.

Having reference now to FIGS. 4 and 5, there is shown an alternative embodiment of a passive communication satellite according to the present invention, generally designated by the reference numeral 31, which differs from the embodiment of FIGS. 2 and 3 mainly in that satellite 31 is adapted to be passively attitude oriented by the gravitational-centrifugal force gradient. Satellite 31 is provided with a reflecting surface which defines a spherical section 32 similar to section 15 of FIG. 2, and constituting a section of an imaginary sphere indicated by dashed line 33. Mast 34, connected at an end thereof to spherical section 32 and extending along an imaginary radial line of sphere 33, serves to support a plurality of strengthening elements or spokes 35 which are interconnected between mast 34 and an inflatable annular tube 36 by conventional connecting means 40 so as to be lightly tensioned. Tube 36 is contiguous with and is connected to the circular periphery of spherical section 32, and thus constitutes a peripheral support means. As in satellite 11, satellite 31 may be provided with a plurality of spokes 37 connected under light tension to mast 34 and tube 36, through conventional spoke connecting means, not shown. The locus of the ends of each of the aforementioned spokes 35, 37 adjacent mast 34 is preferably substantially equidistant from the plane of tube 36. In order to provide greater rigidity of this satellite configuration, rib panels 38 may be interconnected between spokes 37 and spherical section 32.

Referring again to the satellite configuration of FIGS. 2 and 3, it is preferred that, once orbital velocity and altitude have been achieved, the satellite 11 be detached completely from all or most of the launch vehicle structure, and then erected and attitude-stabilized under the influence of active attitude control means 21. On the other hand, satellite 31 may be attitude-stabilized in a different manner. More particularly, satellite 31 may be so stored within its launch vehicle that upon attainment of the desired altitude and velocity, the satellite may be erected by means hereinafter described, but remains attached, through mast 34, to a significant portion of the mass of the launch vehicle; for example, the final stage or the payload container thereof, as generally indicated and schematically illustrated at 39, FIG. 4.

Figures 6A, 6B, 6C, 6D:
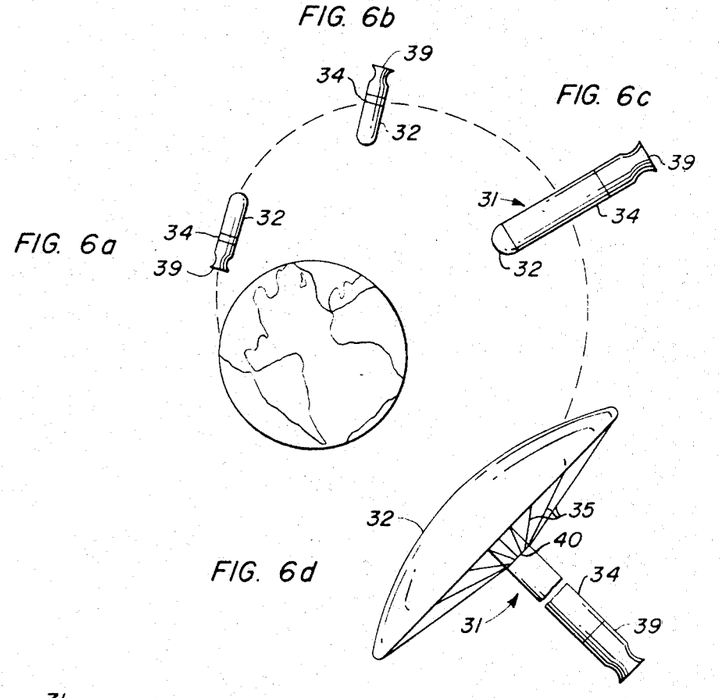
FIGS. 6a, 6b, 6c, and 6d illustrate the satellite of FIGS. 4 and 5 during the sequence of events occurring in a normal orbital mission thereof.

As illustrated in FIGS. 6a, 6b, 6c and 6d, satellite 31 and the attendant launch vehicle may sequentially pass through the stages of launch and acceleration to orbital altitude and velocity, as indicated at FIG. 6a; a pitching maneuver to align the axis of the entire vehicle with a radial line from the Earth, as in FIG. 6b; erection of mast 34 which spaces spherical surface 32 away from significant mass 39, as at FIG. 6c; and finally erection of the entire satellite 31. Aligning mast 34 with a radial line extending from the center of the Earth in this fashion, and thus causing significant mass 39 and the center of mass of spherical section 32 to lie along such a radial line, permits the entire satellite 31 to be attitude-stabilized by the gravitational-centrifugal force gradient. In other words, as is well known, the two major forces acting upon a space vehicle during orbital travel in a closed circular or elliptical path are the attractive force of gravity and the opposing force known as centrifugal force. For a given orbit these forces are of substantially equal magnitude, and act on such a space vehicle generally along a radial line drawn through the center of the Earth. Therefore the space vehicle, or in the present case satellite 31, is most stable wtih the two masses, spherical surface 15 and significant mass 39, centered along a radial line, since in non-centered positions a resultant force couple is established inducing a torque tending to move the two masses back toward the desired positon. Thus satellite 31 may be said to be passively attitude stabilized by the provision of a "dumbell" configuration such as shown in FIG. 6d.

The length of mast 34 should be such that the static moments or force couples occasioned by a deviation of the two masses from a radial line from the center of the Earth is at least somewhat greater than other perturbations such as solar pressure. Therefore, for example, mast length should increase with orbit altitude. Obviously, if satellite 31 were to be tumbling rapidly end-over-end upon initial erection, it would require a lengthy period of time for the gravitational-centrifugal force gradient to succeed in properly stabilizing the satellite; therefore, it may be desirable to provide active or passive damping devices to check such initial tumbling motion. An active attitude control means such as that described hereinbefore may serve this purpose. More ideally, angular motion sensing means, not shown, may be utilized to sense overly rapid tumbling and forcibly correct such action; or structural elements, not shown, may serve to check such tumbling by creating inertial forces opposed to tumbling. Since such devices form no part of the present invention, they are not herein specifically disclosed.

It is to be noted that satellite 31 may be Earth oriented either as shown in FIG. 6d or in a position rotated 180 degrees, with mass 39 nearest the Earth, since in either position the curved reflecting surface provided by spherical section 32 may function to reflect radio signals.

The pitching maneuver for initially attaining the position shown in FIG. 6b may be accomplished by any conventional reaction jet or other vehicle steering devices, not shown, which are not considered to be a part of the present invention.

Figure 7:
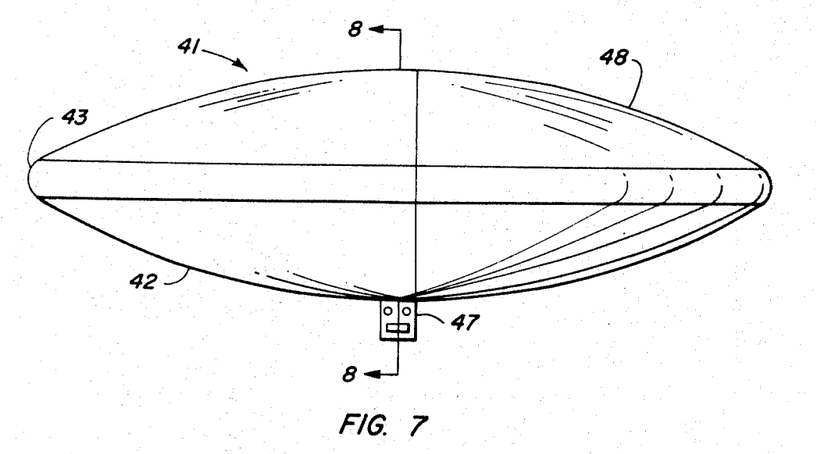
FIG. 7 is a side view of another embodiment of a communication satellite according to the instant invention.
Figure 8:
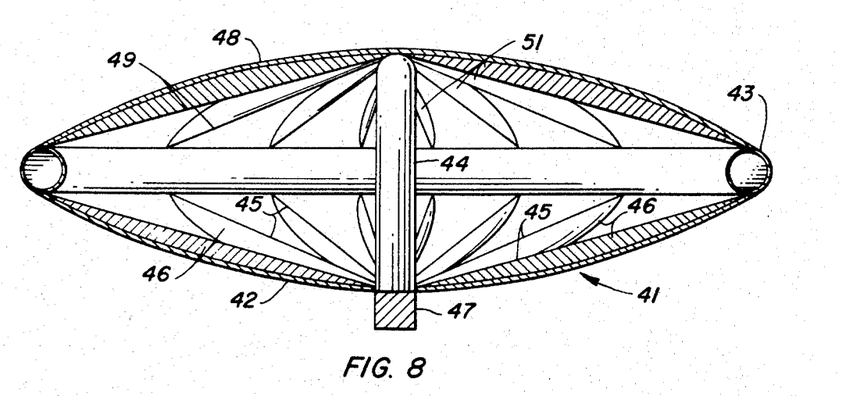
FIG. 8 is a sectional view taken along line 8—8 of FIG. 7.

Another alternative embodiment of a communication satellite in accordance with the instant invention is shown in FIGS. 7 and 8. This satellite, generally designated by the reference numeral 41, is provided with a reflecting surface which includes spherical section 42 having inflatable annular tube 43 connected to the outer periphery thereof, and constituting peripheral support means. Mast 44 is centrally connected to spherical section 42 and extends along a radial line therefrom. Wire spokes 45 may serve as strengthening elements and rib panels 46 may be provided in similar manner to those shown in FIGS. 3 and 5 to furnish increased structural rigidity. To the extent thus far described, it may be seen that satellite 41 is substantially identical to satellites 11 and 31; further, as hereinbefore discussed, active attitude control means 47 may be mounted below mast 44 and may be similar to active attitude control means 21, FIG. 2.

Satellite 41 differs from those previously discussed herein in the provision of an upper spherical section 48 which may include wire spokes 49 and rib panels 51 serving the same function as do the similar elements hereinbefore disclosed, such as elements 23 and 24 in FIG. 3.

It should be noted that instead of, or in addition to, active attitude control means 47, passive attitude control means, no shown, might be readily provided for satellite 41 by extending mast 44 beyond surface 48 and connecting a significant mass thereto as more fully discussed hereinbefore with regard to FIGS. 4, 5 and 6.

Several configurations for passive communication satellites having been hereinbefore disclosed in a general manner, particular attention is now directed to the materials which are preferably used to form the various components of the aforesaid configurations. It is to be understood that each of these materials may be utilized in part or in the whole for constructing any of the previously discussed configurations or other similar satellite shapes or planforms.

The one hundred foot sphere similar to that disclosed in the O'Sullivan Patent No. 2,996,212 hereinbefore identified is adapted to be erected by introducing pressure into the interior thereof much as a conventional balloon is inflated, and differs from such a common inflation operation by the provision of sufficient pressure to tensilely stress the satellite skin material beyond the elastic limit thereof. A significantly different erection procedure may be utilized in erecting the present satellites, as will become readily apparent as the detailed description continues.

More particularly, the passive communication satellites of the present invention may be erected by inflating the component parts thereof. Thus, for example, satellite 11 may be erected by inflating annular tube 22, mast 16, rib panels 24, and spherical section 15. Similarly, satellite 31 may be erected by inflating annular tube 36, mast 34, rib panels 38, and spherical section 32; and erection of satellite 41 may be accomplished by inflating annular tube 43, mast 44, rib panels 46, 51, and spherical sections 42, 48. Accordingly, inflatable annular tubes 22, 36 and 43 may be constructed of a thin, flexible, lightweight material such as a laminate comprising outer layers of aluminum sandwiched about and bonded to an inner layer of polyester film such as Mylar. A laminate thickness of two thousandths of an inch has been found to be suitable for this purpose. Although this laminate is considered preferable, others which may be used will occur readily to those skilled in the art, and, in fact, a sheet of pure Mylar may be used for this purpose, although such a sheet possesses little structural rigidity even when rolled into tubular shape for use as a mast or annular tube.

Inflation pressure producing means may be provided to inflate the tube and mast of each of satellites 11, 31 and 41 simultaneously or in any desired sequence. Such pressure producing means may consist of a storage container, not shown, for storing gas under pressure, as shown in the aforesaid O'Sullivan Patent No. 2,996,212, and communicating with the interior of the tube and mast. Alternatively, a solid material which is adapted to sublimate may be placed within the tube and the mast, so as to produce pressure when desired for erection. Such materials are discussed more specifically hereinafter. Conventional foam generating materials may also be used. Within the scope of this invention, it is necessary only that some inflation means be provided for the mast and the tube, and that such means be actuatable upon command or automatically, so as to insure proper satellite erection. Alternatively, the tube only may be inflated, and the mast simply unrolled or unfolded into tubular form. In the embodiment of FIGS. 7 and 8, or in the other configurations if these be provided with an upper spherical section or a similar membrane, internal pressure of a small magnitude may be provided to assist in inflation and erection by inflating the entire satellite much as a conventional balloon is inflated. Indeed, it is considered preferable to provide such an interior inflating means. Should such means be provided, however, it is desirable to also provide some means to automatically release the entrapped gas within the satellite; that is, entrapped between the spherical section and the upper membrane, subsequent to erection. This is so since, otherwise, a puncture of the membrane or the spherical surface by a micrometeorite, followed by exhaust of the entrapped gas, would serve to create forces changing the orbital path and satellite attitude. Such pressure releasing means may be simply a series of very small holes allowing the gas to exhaust slowly in opposed directions after erection.

Figure 9:
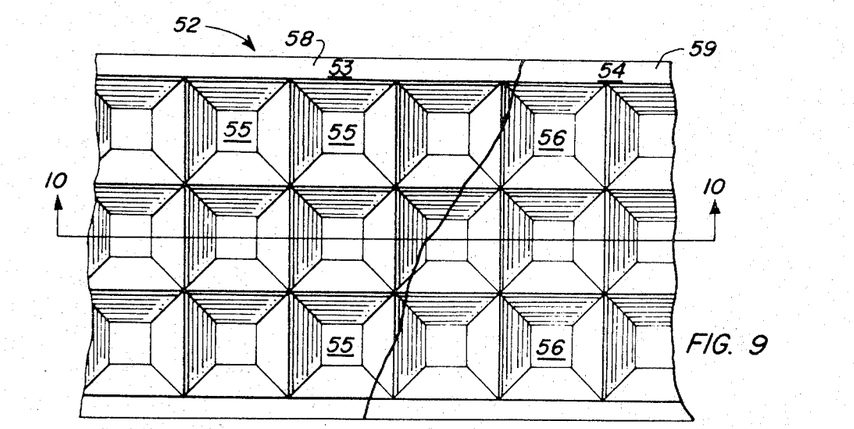
FIG. 9 is a partial plan view of an inflatable panel designed for use in a satellite.
Figure 10:
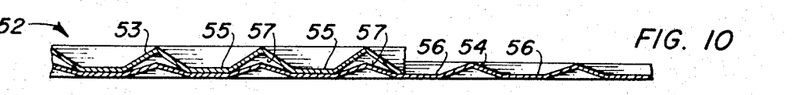
FIG. 10 is a sectional view taken along line 10—10 of FIG. 9.

Spherical sections 15, 32, 42 and 48 may be constructed of any of the novel materials and combinations thereof now to be described. Referring to FIGS. 9 and 10, there is shown a portion of a structural element or inflatable panel 52 comprising a top sheet 53 and a bottom sheet 54 constituting first and second sheets, respectively. Sheet 53 has a plurality of indentations 55 formed therein, and sheet 54 has a plurality of indentations 56 formed therein, each such indentation forming a depression in one side of its respective sheet and a protuberance in the other side thereof. While for purposes of facility and clarity of disclosure, panel 52 and the sheets 53, 54 thereof have been shown as having rather sharply defined, angular indentations of truncated rectangular pyramidal form, it is to be understood that preferably each sheet 53, 54 in cross section has the general form of a slightly modified sine wave with only a small flat portion at the bottom of each indentation therein. Thus it may be said that each depression hereinbefore mentioned constitutes a concavity and each protuberance aforementioned a convexity, such terminology being intended to be generic to either the angular indentations as shown in FIGS. 9 and 10, or more gently curved surfaces as herein described and schematically illustrated.

Sheets 53 and 54 may be bonded together by suitable means such as welding or adhesive bonding, such bonding preferably being continuous along peripheries 58, 59 of the respective sheets so as to form an envelope having an enclosed space therein. A bond is preferably also made as by welding or adhesive bonding at each area of contact between sheets 53, 54. It is to be noted, however, that indentations 56 are preferably somewhat more shallow than are indentations 55 so that when sheets 53 and 54 are placed together, as shown, with the convexities of sheet 53 telescoped within the concavities of sheet 54, a series of small, interconnected spaces 57 are formed where no contact exists between such sheets. Thus spaces 57 together constitute the enclosed space hereinbefore mentioned, sealed by the aforementioned continuous bonding of peripheries, 58, 59. Within one or more of the spaces 57 there may be placed a material having sublimating characteristics and being adapted to sublime when placed in an interplanetary vacuum, as when in orbital travel. One such sublimatory material is chloroacetic acid ($ClCH_2COOH$), which sublimates at a temperature of 61-63 of degrees centigrade. Alternatively, a material or materials of conventional type for generating a foam may be so placed, or any conventional pressure producing means may be connected for communication with such space. Whatever means may be selected to perform this inflating function, it is necessary only that a differential pressure in the neighborhood of 0.3 pound per square inch be generated to inflate panel 52.

Sheets 53, 54 may be formed of various materials, and preferably may comprise aluminum coated Mylar of a thickness of approximately 0.00025 inch. Such a thickness may be attained by depositing aluminum on an extremely thin sheet of Mylar by the vapor deposit method. Alternatively, one of sheets 53, 54 may be such a material and the other pure Mylar.

Figure 11:
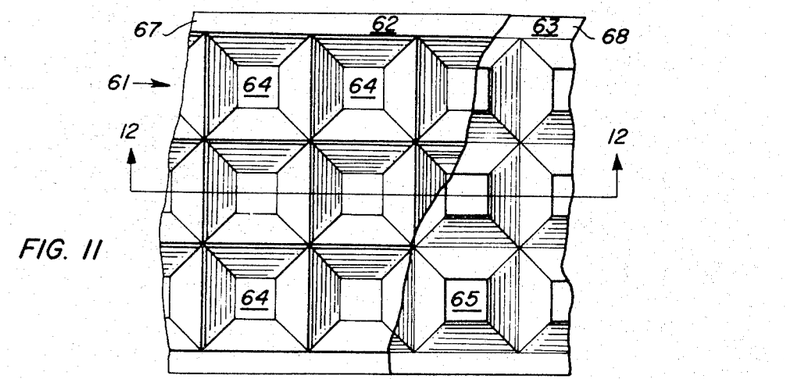
FIG. 11 is a partial plan view of another inflatable panel designed for use in a satellite.
Figure 12:
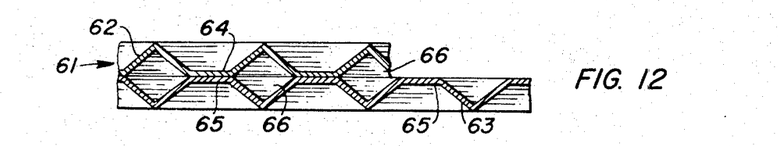
FIG. 12 is a sectional view taken along line 12—12 of FIG. 11.

In FIGS. 11 and 12, an alternative form of inflatable panel is shown. Panel 61 may comprise top or first sheet 62 and bottom or second sheet 63; each sheet having a plurality of indentations 64, 65, respectively, formed therein. As hereinbefore discussed with regard to the panel construction of FIGS. 9 and 10, the panel 61 is shown somewhat schematically, and each sheet thereof may in practice be somewhat more gently curved so as to assume a generally sinusoidal form having only small flat portions at the base of each indentation. Panel 61 differs from panel 52 in that the respective convexities of each sheet are in contact, or, in other words, the sheets are placed in opposed or oppositely facing relationship, as clearly shown in FIG. 12. The sheets may be joined together by adhesive bonding or welding at each point of contact thereof, as discussed with regard to the panel structure shown in FIGS. 9 and 10. Similiarly, peripheries 67 of sheet 62, and 68 of sheet 63, preferably are continuously joined so as to form an envelope enclosing interconnected spaces 66 between the sheets, thus rendering panel 61 inflatable.

Inflation of panel 61 may be accomplished by providing a source of pressure, such as, for example, sublimatory material such as chloroacetic acid, from generating materials, or a conventional container of pressurized gas, communicating with spaces 66, as hereinbefore discussed with respect to sheet 52, FIGS. 9 and 10.

Sheets 62 and 63 preferably may be of 0.00025 inch thicknesses of aluminum coated Mylar, or one of such sheets may be pure Mylar.

A most important property possessed by both panel 52 and panel 61 is that either may be folded flatly into compact areas or spaces, but that upon inflation thereof, and even if subsequent to inflation the internal pressure thereof is dissipated, such panels exhibit greater structural rigidity or stiffness than if left flat and uninflated. In other words, rigidity of such panels is increased by inflation thereof, and consequently such panels tends to retain their inflated shape as shown in the drawings even if the internal pressure thereof should be subsequently decreased. This property is due to the generally cross-braced shape of the inflated panels, similar to a "space frame" structural shape.

The advantages of the aforesaid property in panels designal for used in forming structural components for a passive communication satellite such as satellites 11, 31 and 41 should be obvious. Once such a vehicle is erected and in orbit, puncture of the skin thereof by micrometeorites or the like, or leaks occurring due to any cause, with consequent loss of pressure in the panel interiors, will not cause a change of component shape. Thus a spherical section such as 15, 32, 42 or 48 formed of a plurality of panels 52 or 61 having the shape of gores or other convenient shape possesses qualities and characteristics heretofore not available for such uses.

Panels 52 and 61 are also well suited to serve as rib panels such as panel 24, FIG. 3, panel 38, FIG. 5, and panels 46 and 51, FIG. 7, since, as hereinbefore discussed, such panels exhibit a marked increase in structural rigidity subsequent to inflation.

It is to be understood, therefore, that either panel 52 or panel 61 may be utilized as the basic structural element of any or all of the various spherical sections and rib panels herein disclosed; and, further, such inflatable panels may be utilized in the same satellite. In other words, panel 52 may be utilized for some components and panel 61 for others in the same satellite.

Thus, upon ejection from the final stage or payload container such as shown in FIG. 1 after attainment of orbital altitude and velocity, the passive communication sattelite may be erected by the pressurization and consequent inflation of the various components thereof by the action of pressure producing means such as those hereinbefore described. In each of satellites 11, 31 and 41, a major portion of the work necessary for erection may be performed by the annular tube provided. Further, a significant or major portion of such work may be accomplished by internally pressurizing the space between, for example, spherical sections 42 and 43, as hereinbefore discussed. Thus, as the tube assumes its annular shape from an initial folded position, it draws with it the various spokes, rib panels, and spherical sections. However, a not inconsiderable portion of the erection force necessary is provided by the action of the erection gas within the inflatable panels forming the spherical sections and the rib panels, which tends to enlarge the spaces such as 57 in FIG. 10, thus serving to strengthen and form each panel.

Of course, numerous methods of constructing and assembling panels such as 52 and 61 will occur readily to those skilled in the art, but two methods will now be described which have been found to be particularly suited to the forming of these panels without damaging the delicate components thereof. It is to be understood that these methods are described merely as being illustrative fabribation procedures, and not by way of limitation as to the structure of the panels hereinbefore disclosed.

In order to fabricate panel 52 by the preferred method now to be set forth, there may be provided as fabricating equipment a metal plate having a plurality of male protuberances thereon corresponding in shape and arrangement to the concavities formed by indentations 55 in sheet 53, FIGS. 9 and 10. Thus this metal plate, not shown, may be said to present a general appearance somewhat similar to a conventioneal waffle-iron plate. Passing through such plate there may be a plurality of regularly spaced holes or perforations preferably beginning on the plate surface between the adjaceint male protuberances and extending through the opposite side of the plate. In sealed relationship with such other side of the plate, and thus in communication with the aforementioned plurality of holes there may be provided an evacuation chamber which is in turn connected through a suitable hose or tube to a conventional evacuation means such as a vacuum pump. Mounted centrally or otherwise positioned above the plate there may be provided a suitable nozzle or other distributor which is connected to a source of heated air or gas and directed so as to discharge a flow of such air or gas upon the surface of the plate and generally normal thereto. With such equipment, or the equivalent thereof, a panel such as panel 52 may be fabricated by the following steps:

(1) Placing two sheets, such as 53, 54, in overlying relationship on the aforementioned plate;

(2) Creating a partial vacuum beneath the lower of the sheets by operating the evacuating means as hereinbefore described, thus tending to draw the sheets into conformity with the male protuberances on the plate;

(3) Directing a flow of heated gas from the provided source upon the upper sheet, thus further conforming the sheets to the male protuberances through the combined effects of heat and pressure;

(4) If sublimatory or foam generating materials are to be utilized, as hereinbefore described, inserting the desired material between the sheets along the peripheries thereof; and (5) Bonding the peripheries of the sheets in order to form same into an envelope.

As for the hereinbefore mentioned bonding of each convexity of sheet 53 to the corresponding concavity of sheet 54, this step, and the sequencing thereof in the method just detailed, is, of course, governed by the types of material forming sheets 53, 54, and the type of bonding desired. It is preferable that this step be accomplished prior to the introduction of a sublimatory material between the sheets; this is especially so if heating is necessary to create the bonds. On convenient means of forming these small bonds in panels wherein each sheet is aluminum coated, is by conventional sonic welding.

A similar process may be utilized in fabricating panels 61, differing in that duplicate sets of the hereinbefore mentioned apparatus may be provided; the aforementioned male proturberanced plates being matching in form. Therefore, subsequent to the steps of placing an individual sheet 62 or 63 on each plate, creating partial vacuum therebeneath, and applying the heated air flow thereto from above, the respective sheets may be placed together in the relationship shown in FIGS. 11 and 12, and suitably bonded, both at the peripheries thereof and intermediate of such peripheries, together with insertion of the desired materials between such sheets, as aforementioned.

It is to be understood that various methods other than those just described may, in practice, be devised and utilized.

Figure 13:
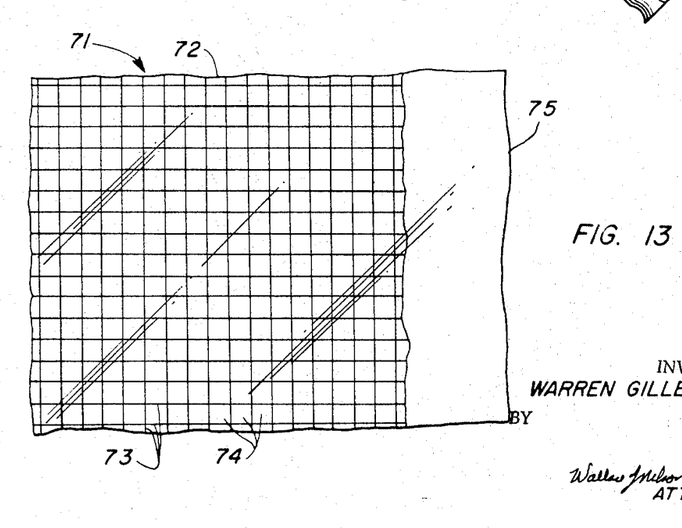
FIG. 13 is a partial plan view of another inflatable panel designed for use in a satellite.

Referring now to FIG. 13, there is shown by way of illustration a panel 71 which comprises a transparent sheet 72 and very fine diameter wires 73 so positioned or mounted thereon as to form a grid pattern or mesh having square spaces 74 therein approximately two tenths of an inch or less on a side. Such a panel may be constructed by molding a sheet of Mylar about a grid formed of aluminum wire; and, further, a second sheet 75 be bonded at its periphery to the first sheet so as to form an envelope constituting an inflatable panel 71. In a preferred form, wires 73 are aluminum and second sheet 75 is Mylar film. However, other materials may be used for these elements, so long as the sheet material is transparent, or pervious to light, and the wire is of a material which will reflect radio frequency waves. Rather than being molded into sheet 72, wires 73 may be bonded thereto in known manner, or etched thereon, if desired.

So long as panel 71 is constructed so as to be pervious to light but impervious to radio signals, it possesses qualities quite desirable for a structural element of a passive communication satellite. The spacing of wires 73 at two tenths of an inch apart or less, as hereinbefore described, allows the combined Mylar and aluminum panel 71 to pass light therethrough. Thus, such a panel is substantially unaffected by solar pressure. Conversely, this same spacing is sufficiently small or close to reflect radio signals up to frequencies of 10,000 megacycles per second with a coefficient of reflection of approximately 80%. Further, the aluminum wire mesh mounted on or in the Mylar sheet exhibit greater structural rigidity than would a similar weight of aluminum deposited evenly over a Mylar surface.

Erection of panel 71 may be accomplished by inflation thereof, which may be carried out by any of the methods heretofore discussed with regard to panels 52 or 61, such as placing a sublimating material between sheets 72 and 75, or by connecting a source of pressurized gas, not shown, to the space between these sheets, or by foaming materials.

Obviously, a plurality of panels 71 may be used to form the spherical sections or rib panels hereinbefore disclosed, in the same manner as discussed with regard to panels 52 and 61. While the various panels may be used in any of the satellite configurations of FIGS. 2–8, certain of these panels are preferably utilized in certain of these configurations, as will appear more clearly hereinafter.

More specifically, with reference to the embodiments of FIGS. 2, 3, 4 and 5, if panels 52 or 61 are utilized to form the various spherical sections and rib panels therein described, sunlight impinging upon the satellite from above; that is, striking the concave side of the spherical section, will be reflected against the mast, thus causing heating problems of a possibly critical nature. If panels such as panels 71 are used in these configurations, however, such reflection will not occur, since panel 71 is pervious to sunlight, and therefore the problem of mast heating is avoided. Similarly, in the configuration of FIGS. 7 and 8, if panels such as 52 or 61 are used for the upper and lower spherical sections, mast heating cannot occur since sunlight from any direction is reflected away thereby. However, in this configuration, it may be desirable to use upper spherical section 48 merely as an erection aid, in which case a weight saving could be effected by using Mylar sheets alone for such inflatable panels or as membranes, in which case mast heating would be a problem were panels such as 52, 61 utilized for lower spherical section 42. Thus, although it is to be understood that the present invention in its broader aspects contemplates the use of any of these panels in any of the configurations disclosed, it is preferred that panels such as panel 71 be used in the configurations of FIGS. 2, 3, 4 and 5, and also in FIGS. 7 and 8 if the upper spherical section thereof is transparent.

The various structural details such as connecting means between various components of the several configurations disclosed herein may differ greatly in specific applications. However, the elements next to be described are considered to be well suited to serve the necessary functions thereof while at the same time providing simple, rugged, lightweight, compact structural members.

Figure 14:
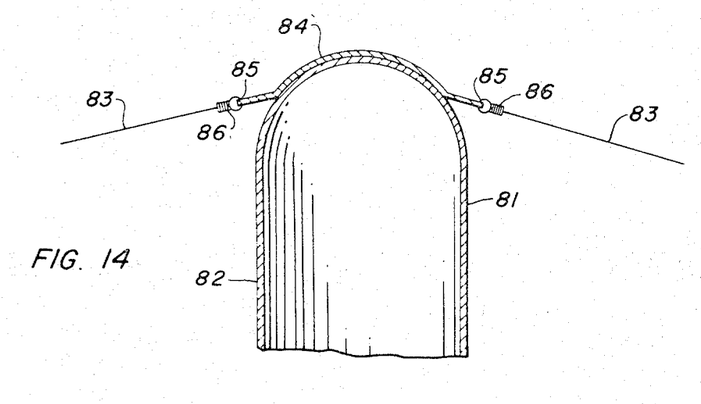
FIGS. 14–18 are partial detailed views of various structural components adapted for use in a typical satellite.
Figure 15:
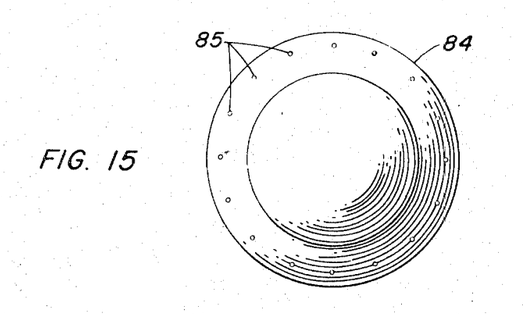

In FIG. 14 there is shown the upper portion 81 of a mast 82 which may correspond to any of the masts hereinbefore described. In order to provide means for connecting the wire spokes 83 to mast 82, a spoke connecting means or cap plate 84 is rigidly mounted on end 81 thereof, as by means of an adhesive, not shown. As more clearly shown in FIG. 15, cap plate 84 may be a generally circular plate shaped into a dish configuration having a plurality of holes 85 drilled or tapped therethrough in radially spaced relation around the periphery thereof. Spokes 83 may be connected to cap plate 84 through holes 85 in any convenient manner, as, for example, by means of a conventional eye splice and thimble arrangement, illustrated schematically at 86, FIG. 14.

Figure 16:
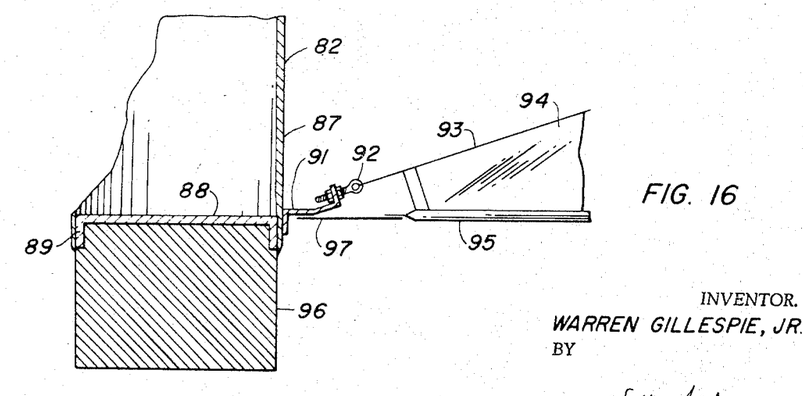

FIG. 16 shows the lower portion 87 of mast 82, which may correspond to the lower end of any of the masts hereinbefore disclosed. The end of lower portion 87 is secured between an inner base plate 88 having an annular peripheral flange 89 integral therewith, and tensioning ring 91, which may take any convenient form and serves to mount a plurality of tensioning eye bolts 92 which, in turn, are connected to respective wire spokes 93, thus constituting spoke connecting means. Secured, as by an adhesive bond, to each wire spoke 93 is a rib panel 94, which may also be bonded or welded to an adjacent panel 95 of the spherical reflector section. Obviously, wire spokes 93, rib panels 94, and panels 95 may correspond to the similar elements disclosed in FIGS. 2–8 and hereinbefore described. Housing 96 may be supported by base plate 88 and may contain, for example, an active attitude control means or other instrumentation or controls. A collar 97 may connect panel 95 to tensioning ring 91, and may be formed of a Mylar and aluminum laminate and adhesively bonded or welded to these elements.

Figure 17:
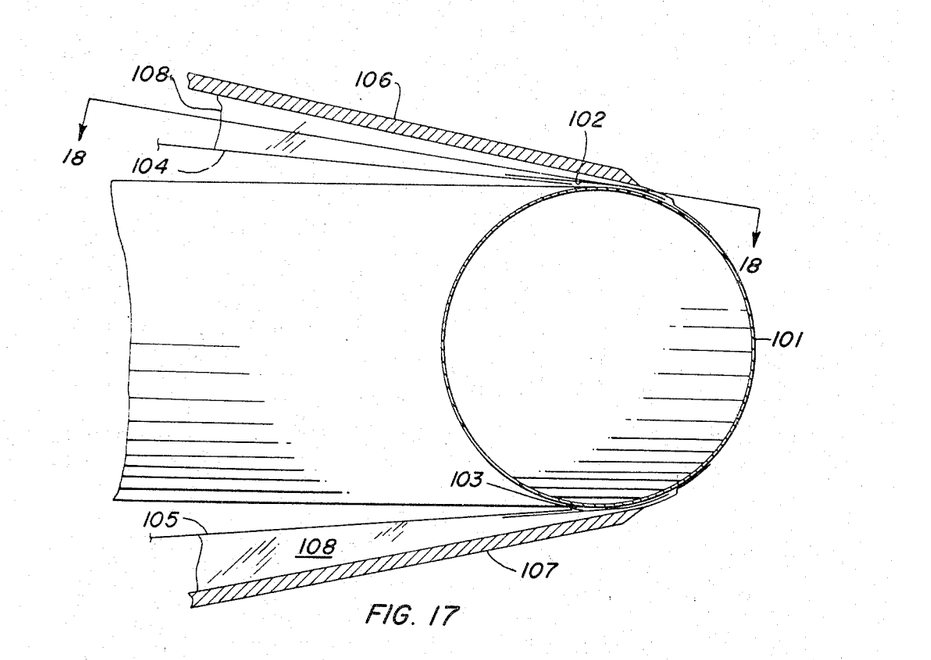
Figure 18:
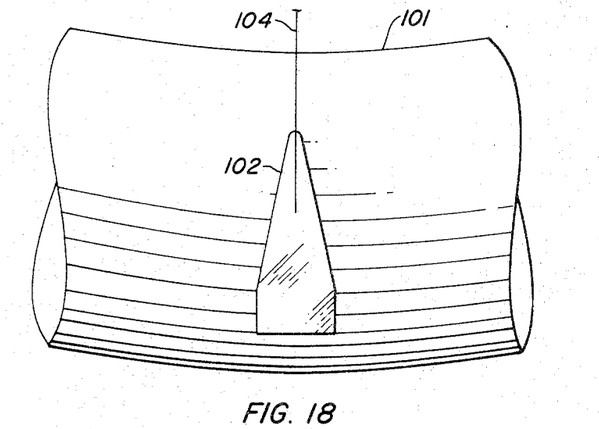

In FIG. 17 there is shown somewhat schematically one preferred construction of the interconnected annular tube, spherical section, rib panels, spokes and the like, which obviously may be any of these elements hereinbefore disclosed. Annular inflatable tube 101 has secured thereto tabs 102, 103 which may be of generally triangular shape as best shown in FIG. 18 and which are preferably adhesively bonded or welded to tube 101. In turn, wire spokes 104, 105 may be bonded or welded or suitably attached to their respective tabs; one of the latter being provided for each spoke. Inflatable panels 106, 107 of the type previously described are secured to tube 101 in suitable manner, as, for example, in overlapping relationship to the adjacent tabs, and one or more of the spokes 104, 105 may have an inflatable rib panel such as 108 attached thereto and to the adjacent inflatable panel.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A method of fabricating an inflatable panel for use as a structural component of an inflatable reflective satellite, comprising the steps of:
    placing a pair of thin sheets of metallic coated plastics material in overlying relationship upon a plate having a plurality of male protuberances thereon, said material having the inherent physical property characteristics of developing a permanent set when subjected to heat and pressure,
    creating a partial vacuum between the lower of such sheets and said plate so as to cause said lower sheet to conform to the contour of said plate and of sufficient force as to stretch and cause thinning of said lower sheet, and to cause the upper of said sheets to be drawn into essential conformity with said plate while remaining spaced, in part, from said lower sheet,
    directing a flow of heated gas upon the upper of said sheets of sufficient intensity to develop a permanent set in both said sheets as caused by said vacuum and said plate protuberances,
    inserting a sublimatory material within the spacing provided between said sheets, and
    bonding the peripheries of said sheets together.

2. A method of fabricating an inflatable panel for use as a structural component of an inflatable reflective satellite comprising the steps of:
    placing a first thin sheet of a metallic coated plastics material on a plate having a plurality of male protuberances thereon,
    creating a partial vacuum between said first sheet and said plate,
    directing a flow of heated gas upon said first sheet,
    placing a second thin sheet of a metallic coated plastics material on the plate having a plurality of male protuberances thereon,
    creating a partial vacuum between said second sheet and said plate,
    directing a flow of heated gas upon said second sheet, said metallic coated plastics material making up said sheets having the inherent physical property characteristics of developing a permanent set when subjected to said vacuum and said flow of heated gas,
    placing said first and second sheets in abutting face-to-face relationship,
    inserting a sublimatory material between said sheets, and
    bonding the peripheries of said sheets together so as to form an enclosed space therebetween with said space being characterized by sections therein conforming to essentially twice the height of said male protuberances on said plate.

References Cited

UNITED STATES PATENTS

| | | | |
|---|---|---|---|
| 1,920,961 | 8/1933 | Anderson | 156—292 |
| 2,862,543 | 12/1958 | Kaminsky | 156—497 |
| 3,080,910 | 3/1963 | Whitney | 156—497 |
| 3,142,599 | 7/1964 | Chavannes | 156—210 |
| 2,474,035 | 6/1949 | Crandon | 156—285 |
| 2,670,501 | 3/1954 | Michiels | 156—210 X |
| 2,778,173 | 1/1957 | Taunton | 53—22 |
| 2,915,427 | 12/1959 | Schriner et al. | 156—214 |
| 2,983,638 | 5/1961 | Quehl | 156—581 |
| 3,048,514 | 8/1962 | Bentele et al. | 156—292 X |
| 3,098,563 | 7/1963 | Skees | 206—46 |
| 2,740,961 | 4/1956 | Slater | 318—489 XR |
| 2,996,212 | 8/1961 | O'Sullivan | 156—165 XR |
| 3,038,077 | 6/1962 | Gillespie, et al. | 250—234 XR |

EARL M. BERGERT, *Primary Examiner.*

H. F. EPSTEIN, *Assistant Examiner.*